P. H. INMAN & CHARLES B. WITHINGTON.
Improvement in Coffee-Pots.
No. 114,012.
Patented April 25, 1871.
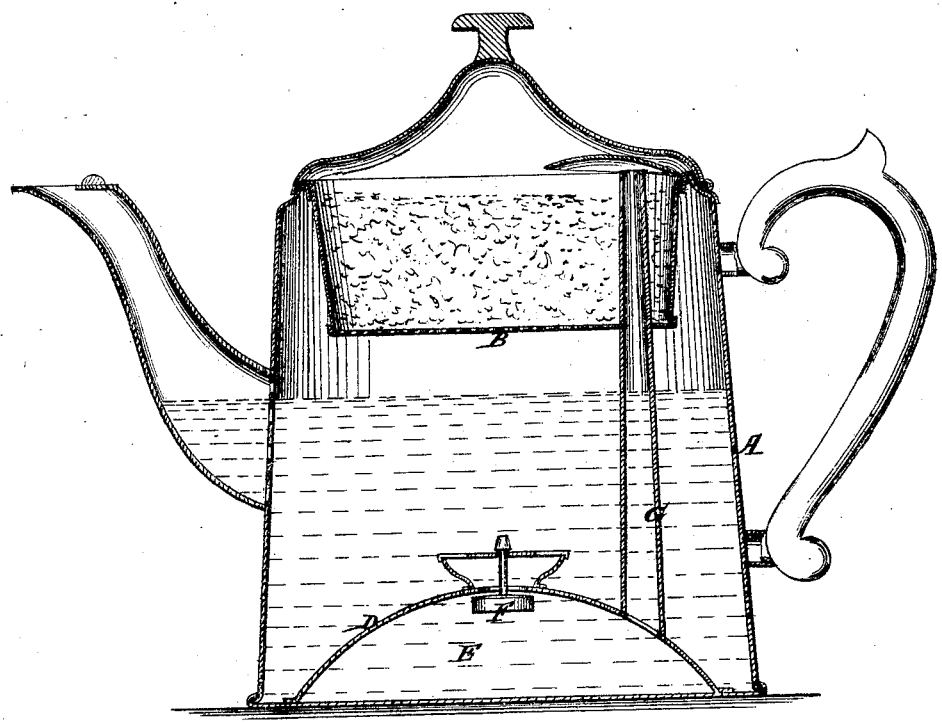
Witnesses:
E. Wolff
Wm. H. L. Smith.
Inventor:
P. H. Inman.
C. B. Withington.
PER
Attorneys.

United States Patent Office.

PETER H. INMAN AND CHARLES B. WITHINGTON, OF JANESVILLE, WISCONSIN.

Letters Patent No. 114,012, dated April 25, 1871.

IMPROVEMENT IN COFFEE-POTS.

The Schedule referred to in these Letters Patent and making part of the same.

*To all whom it may concern:*

Be it known that we, PETER H. INMAN and CHARLES B. WITHINGTON, of Janesville, in the county of Rock and State of Wisconsin, have invented a new and improved Coffee-Pot; and we do hereby declare that the following is a full, clear, and exact description thereof, which will enable others skilled in the art to make and use the same, reference being had to the accompanying drawing forming part of this specification.

This invention relates to improvements in coffee-pots, and consists in a combination, with a percolator placed in the upper part of the pot for receiving the ground coffee, of apparatus of a novel character, as hereinafter described, for causing a flow of water from below, as it becomes heated, up to the percolator for filtering the coffee.

The drawing is a sectional elevation of our improved coffee-pot.

A is a pot of ordinary construction, with a percolating-cup, B, fitted in it at the top, below the cover, in which cup the ground coffee is to be placed for filtering.

D represents an inverted cup-shaped piece of sheet metal of any suitable form, attached to the bottom as shown, or it may be a plane diaphragm arranged a short distance above the bottom so as to cover the bottom or nearly so, and inclose a small space, E, above it.

F is a check-valve fitted in a hole in said cup at the highest point, or thereabout, and opening downward.

G is a tube leading from space D up through the bottom of the percolator, and extending about as high as the top of it.

A suitable quantity of water being put into the pot A and coffee in the cup B, the water will fill space E. That portion in this space will be heated before the other is, and the steam generated therein will lift the valve F; or it may be made lighter than the water to be lifted by it when the space is full, and prevent the escape of steam that way; consequently the steam will find its way up through pipe G to the percolator, carrying more or less water with it, and filtering the coffee as it falls back to the space above cup D. This will continue until the water has been expelled from space E enough for the pressure to become less therein than above it, when the valve F will be opened again and another supply of water will be admitted to space E, and so on as long as the pot is kept sufficiently hot.

This apparatus thus affords a simple and ready means of completely extracting the flavoring substance of the coffee from the solid matter by the filtering process.

Having thus described our invention,

We claim as new and desire to secure by Letters Patent—

The combination, with the vessel A and the percolator B, of the cup D, or a diaphragm, valve F, and tube G, all arranged for operation substantially as specified.

PETER H. INMAN.
CHAS. B. WITHINGTON.

Witnesses:
S. A. HUDSON,
HENRY PALMER.